US006680264B2

(12) United States Patent
Julemont

(10) Patent No.: US 6,680,264 B2
(45) **Date of Patent: *Jan. 20, 2004**

(54) GLASS CLEANING WIPE

(75) Inventor: Jean Julemont, Verviers (BE)

(73) Assignee: Colgate-Palmolive Co., Piscataway, NJ (US)

(*) Notice: Subject to any disclaimer, the term of this patent is extended or adjusted under 35 U.S.C. 154(b) by 285 days.

This patent is subject to a terminal disclaimer.

(21) Appl. No.: 09/904,357

(22) Filed: Jul. 12, 2001

(65) Prior Publication Data

US 2003/0013365 A1 Jan. 16, 2003

(51) Int. Cl.$^{7}$ .......................... B32B 27/04; B32B 27/12; B32B 5/02; B32B 9/04

(52) U.S. Cl. ............................ 442/64; 442/71; 442/93; 442/96; 442/118; 442/153; 442/165

(58) Field of Search ............................ 442/93, 64, 71, 442/96, 118, 153, 165

(56) References Cited

U.S. PATENT DOCUMENTS

| | | | | | |
|---|---|---|---|---|---|
| 4,448,704 | A | * | 5/1984 | Barby et al. | 15/104.93 |
| 4,753,844 | A | * | 6/1988 | Jones et al. | 428/288 |
| 4,797,310 | A | * | 1/1989 | Barby et al. | 428/71 |
| 5,827,522 | A | * | 10/1998 | Nowak | 424/405 |
| 6,071,549 | A | * | 6/2000 | Hansen | 427/2.31 |
| 6,207,596 | B1 | * | 3/2001 | Rourke et al. | 442/123 |
| 6,228,389 | B1 | * | 5/2001 | McCue et al. | 424/443 |
| 6,287,584 | B1 | * | 9/2001 | Feuer et al. | 424/404 |
| 6,303,119 | B1 | * | 10/2001 | Weisgerber et al. | 424/94.63 |
| 6,376,443 | B1 | * | 4/2002 | Julemont | 510/238 |
| 6,380,152 | B1 | * | 4/2002 | Julemont et al. | 510/438 |

* cited by examiner

*Primary Examiner*—Cheryl A. Juska
*Assistant Examiner*—Christopher C. Pratt
(74) *Attorney, Agent, or Firm*—Richard E. Nanfeldt

(57) ABSTRACT

A glass cleaning wipe comprising a nonwoven fabric containing wood pulp fibers, the nonwoven fabric is impregnated with a glass cleaning composition.

8 Claims, No Drawings

GLASS CLEANING WIPE

FIELD OF INVENTION

The present invention relates to a nonwoven fabric which has been impregnated with a liquid glass cleaning composition.

BACKGROUND OF THE INVENTION

The patent literature describes numerous wipes for both body cleaning and cleaning of hard surfaces but none describe the instant glass cleaning wipes which have improved cleaning characteristics in the minimization of streaking and residue.

U.S. Pat. Nos. 5,756,612; 5,763,332; 5,908,707; 5,914,177; 5,980,922 and 6,168,852 teach cleaning compositions which are inverse emulsions.

U.S. Pat. Nos. 6,183,315 and 6,183,763 teach cleaning compositions containing a proton donating agent and having an acidic pH.

U.S. Pat. Nos. 5,863,663; 5,952,043; 6,063,746 and 6,121,165 teaches cleaning compositions which are out in water emulsions.

SUMMARY OF THE INVENTION

A glass cleaning wipe comprising a nonwoven fabric containing wood pulp fibers, wherein is the nonwoven fabric is impregnated with a liquid glass cleaning composition containing an anionic surfactant, a cosurfactant, an alkanol, a quaternary alkylol amine salt and water, wherein the liquid glass cleaning composition is not an emulsion and does not contain proteins, metallic salts, enzymes, amides, sodium hypochlorite, dimethicone, a proton donating agent, N-methyl-2-pyrrolidone, monoalkyl phosphate or silicon based sulfosuccinate.

DETAILED DESCRIPTION OF THE INVENTION

The present invention relates to a glass cleaning wipe which comprises approximately:

(a) 30 wt. % to 40 wt. % of a nonwoven fabric consisting of 60 wt. % to 95 wt. % of wood pulp fibers, 2.5 wt. % to 10 wt. % of viscose fibers and 2.5 wt. % to 10 wt. % of polyester fibers; and (b) 60 wt. % to 70 wt. % of a liquid glass cleaning composition being impregnated in said nonwoven fabric, wherein said liquid glass cleaning composition comprises:

- (i) 0.1 wt. % to 5 wt. %, 0.25 wt. % to 4 wt. % of an anionic surfactant;
- (ii) 0.5 wt. % to 10 wt. %, more preferably 1 wt. % to 6 wt. % of a $C_1$–$C_4$ alkanol;
- (iii) 0.5 wt. % to 8 wt. %, more preferably 1 wt. % to 5 wt. % of a cosurfactant;
- (iv) 0.1 wt. % to 1 wt. %, more preferably 0.2 wt. % to 0.8 wt. % of an antirain or antidust agent, a cationic quaternary alkylolamine salt, or choline chloride;
- (v) 0 to 0.25 wt. %, more preferably 0.01 wt. % to 0.1 wt. % of a perfume;
- (vi) 0 to 0.1 wt. %, more preferably 0.01 wt. % to 0.1 wt. % of a preservative such as iodo propynyl butyl carbanate; and
- (vii) the balance being water, wherein the composition has a pH of about 7 to about 9.5, more preferably about 7.5 to about 8.5.

The anionic surfactant used in the instant invention are selected from the group consisting of sulfate anionic surfactants and sulfonate anionic surfactants, wherein the preferred anionic surfactant is a $C_8$–$C_{18}$ ethoxylated alkyl ether sulfate surfactant.

The anionic sulfonate surfactants which may be used in the detergent of this invention are water soluble and include the sodium, potassium, ammonium and ethanolammonium salts of linear $C_8$–$C_{16}$ alkyl benzene sulfonates; $C_{10}$–$C_{20}$ paraffin sulfonates, alpha olefin sulfonates containing about 10–24 carbon atoms and $C_8$–$C_{18}$ ethoxylated alkyl ether sulfates and mixtures thereof. The preferred anionic sulfonate surfactant is a $C_{12-18}$ paraffin sulfonate.

The paraffin sulfonates may be monosulfonates or di-sulfonates and usually are mixtures thereof, obtained by sulfonating paraffins of 10 to 20 carbon atoms. Preferred paraffin sulfonates are those of $C_{12-18}$ carbon atoms chains, and more preferably they are of $C_{14-17}$ chains. Paraffin sulfonates that have the sulfonate group(s) distributed along the paraffin chain are described in U.S. Pat. Nos. 2,503,280; 2,507,088; 3,260,744; and 3,372,188; and also in German Patent 735,096. Such compounds may be made to specifications and desirably the content of paraffin sulfonates outside the $C_{14-17}$ range will be minor and will be minimized, as will be any contents of di- or poly-sulfonates.

Examples of suitable other sulfonated anionic detergents are the well known higher alkyl mononuclear aromatic sulfonates, such as the higher alkylbenzene sulfonates containing 9 to 18 or preferably 9 to 16 carbon atoms in the higher alkyl group in a straight or branched chain, or $C_{8-15}$ alkyl toluene sulfonates. A preferred alkylbenzene sulfonate is a linear alkylbenzene sulfonate having a higher content of 3-phenyl (or higher) isomers and a correspondingly lower content (well below 50%) of 2-phenyl (or lower) isomers, such as those sulfonates wherein the benzene ring is attached mostly at the 3 or higher (for example 4, 5, 6 or 7) position of the alkyl group and the content of the isomers in which the benzene ring is attached in the 2 or 1 position is correspondingly low. Preferred materials are set forth in U.S. Pat. No. 3,320,174, especially those in which the alkyls are of 10 to 13 carbon atoms.

The $C_{8-18}$ ethoxylated alkyl ether sulfate surfactants have the structure $$R—(OCHCH_2)_nOSO_3^-M^+$$

wherein n is about 1 to about 22 more preferably 1 to 3 and R is an alkyl group having about 8 to about 18 carbon atoms, more preferably 12 to 15 and natural cuts, for example, $C_{12-14}$ or $C_{12-16}$ and M is an ammonium cation or a metal cation, most preferably sodium.

The ethoxylated alkyl ether sulfate may be made by sulfating the condensation product of ethylene oxide and $C_{8-10}$ alkanol, and neutralizing the resultant product. The ethoxylated alkyl ether sulfates differ from one another in the number of carbon atoms in the alcohols and in the number of moles of ethylene oxide reacted with one mole of such alcohol. Preferred ethoxylated alkyl ether polyethenoxy sulfates contain 12 to 15 carbon atoms in the alcohols and in the alkyl groups thereof, e.g., sodium myristyl (3 EO) sulfate.

Ethoxylated $C_{8-18}$ alkylphenyl ether sulfates containing from 2 to 6 moles of ethylene oxide in the molecule are also suitable for use in the invention compositions. These detergents can be prepared by reacting an alkyl phenol with 2 to 6 moles of ethylene oxide and sulfating and neutralizing the resultant ethoxylated alkylphenol.

As used herein and in the appended claims the term "perfume" is used in its ordinary sense to refer to and include any non-water soluble fragrant substance or mixture of substances including natural (i.e., obtained by extraction of flower, herb, blossom or plant), artificial (i.e., mixture of natural oils or oil constituents) and synthetically produced substance) odoriferous substances. Typically, perfumes are complex mixtures of blends of various organic compounds such as alcohols, aldehydes, ethers, aromatic compounds and varying amounts of essential oils (e.g., terpenes) such as from 0% to 80%, usually from 10% to 70% by weight, the essential oils themselves being volatile odoriferous compounds and also serving to dissolve the other components of the perfume.

In the present invention the precise composition of the perfume is of no particular consequence to cleaning performance so long as it meets the criteria of water immiscibility and having a pleasing odor. Naturally, of course, especially for cleaning compositions intended for use in the home, the perfume, as well as all other ingredients, should be cosmetically acceptable, i.e., non-toxic, hypoallergenic, etc. The instant compositions show a marked improvement in ecotoxocity as compared to existing commercial products.

The cosurfactants in the instant compositions are selected from the group consisting of polypropylene glycol of the formula $HO(CH_3CHCH_2O)_nH$ wherein n is a number from 1 to 18, and mono and di $C_1$–$C_6$ alkyl ethers and esters of ethylene glycol and propylene glycol having the structural formulas $R(X)_nOH$, $R_1(X)_nOH$, $R(X)_nOR$ and $R_1(X)_nOR_1$ wherein R is $C_1$–$C_6$ alkyl group, $R_1$ is $C_2$–$C_4$ acyl group, X is $(OCH_2CH_2)$ or $(OCH_2(CH_3)CH)$ and n is a number from 1 to 4, diethylene glycol, triethylene glycol, an alkyl lactate, wherein the alkyl group has 1 to 6 carbon atoms, 1methoxy-2-propanol, 1methoxy-3-propanol, and 1methoxy 2-, 3- or 4-butanol.

Representative members of the polypropylene glycol include dipropylene glycol and polypropylene glycol having a molecular weight of 150 to 1000, e.g., polypropylene glycol 400. Satisfactory glycol ethers are ethylene glycol monobutyl ether (butyl cellosolve), diethylene glycol monobutyl ether (butyl carbitol), triethylene glycol monobutyl ether, mono, di, tri propylene glycol monobutyl ether, tetraethylene glycol monobutyl ether, mono, di, tripropylene glycol monomethyl ether, propylene glycol monomethyl ether, ethylene glycol monohexyl ether, diethylene glycol monohexyl ether, propylene glycol tertiary butyl ether, ethylene glycol monoethyl ether, ethylene glycol monomethyl ether, ethylene glycol monopropyl ether, ethylene glycol monopentyl ether, diethylene glycol monomethyl ether, diethylene glycol monoethyl ether, diethylene glycol monopropyl ether, diethylene glycol monopentyl ether, triethylene glycol monomethyl ether, triethylene glycol monoethyl ether, triethylene glycol monopropyl ether, triethylene glycol monopentyl ether, triethylene glycol monohexyl ether, mono, di, tripropylene glycol monoethyl ether, mono, di tripropylene glycol monopropyl ether, mono, di, tripropylene glycol monopentyl ether, mono, di, tripropylene glycol monohexyl ether, mono, di, tributylene glycol mono methyl ether, mono, di, tributylene glycol monoethyl ether, mono, di, tributylene glycol monopropyl ether, mono, di, tributylene glycol monobutyl ether, mono, di, tributylene glycol monopentyl ether and mono, di, tributylene glycol monohexyl ether, ethylene glycol monoacetate and dipropylene glycol propionate. While all of the aforementioned glycol ether compounds provide the described stability, the most preferred cosurfactant is propylene glycol N-butyl ether.

The preferred $C_1$–$C_4$ alkanols are ethanol or isopropanol and mixtures thereof The final essential ingredient in the instant is water. The proportion of water in the compositions generally is in the range of 70 wt. % to 98.5 wt. %.

The liquid glass cleaning composition of this invention may, if desired, also contain other components either to provide additional effect or to make the product more attractive to the consumer. The following are mentioned by way of example: Colors or dyes in amounts up to 0.5% by weight; preservatives or antioxidizing agents, such as formalin, 5-bromo-5-nitro-dioxan-1,3; 5-chloro-2-methyl-4-isothaliazolin-3-one, 2,6-di-tert.butyl-p-cresol, etc., in amounts up to 2% by weight; and pH adjusting agents, such as sulfuric acid or sodium hydroxide, as needed.

The liquid glass cleaning compositions are prepared by simple batch mixing at 25° C.–30° C. The nonwoven fabric is impregnated with the liquid glass cleaning composition by means of a positive impregnation process. The liquid is positively fed into the nonwoven fabric through a controlled gear pump and injection bar at a ratio of about 2 grams of liquid glass cleaning composition to about 1 gram of the nonwoven fabric.

The nonwoven fabric which is manufactured by Dexter Corporation under the name Hydraspun comprises about 60% to 95% of wood pulp fabrics, 2.5 wt. % to 20 wt. % of viscose fibers and 2.5 wt. % to 20 wt. % of polyester fibers. Excluded as substrates for the wipes are any nonwoven fabric substitute that does not contain at least 50 wt. % of wood pulp fibers such as Spunlace nonwoven fabric substrate.

The following examples illustrate liquid cleaning compositions of the described invention. Unless otherwise specified, all percentages are by weight. The exemplified compositions are illustrative only and do not limit the scope of the invention. Unless otherwise specified, the proportions in the examples and elsewhere in the specification are by weight.

EXAMPLE 1

The following glass wipe liquid glass cleaning wipes were made by the aforementioned process.

| | A Wt. % | B Wt. % |
|---|---|---|
| Part I | | |
| Propylene glycol N-butyl ether | 3.0 | 3.0 |
| Ethanol | 3.0 | 3.0 |
| C12–C14 ethoxylated alkyl ether sulfate EO2:1 | 0.75 | 0.75 |
| Quaternary alkylol amine salt Avitex DN (Dupont Chemical) | 0.5 | 0.5 |
| Perfume | 0.05 | 0.05 |
| Water | 92.7 | 92.7 |
| Part II | | |
| Part I | 66.66% | 66.66% |
| Spunlace | 33.34% | |
| Hydapun 8579 | | 33.34% |

Formulas A and B were tested for cleaning performance on both pespex tiles and a mirror and rated on a 10 point scale (0=very poor/much residue and 10=very good/no residue).

| | A | B |
|---|---|---|
| Pespex tiles | 4.8 | 8.0 |
| Mirror | 5.4 | 7.2 |

15 cm×15 cm Perspex black tiles are wiped with the impregnated test substrate in a circular movement such that the middle of the tile is wet and contours kept dry.

Each test product is applied on 5 different tiles (=5 replicates), then 5 judges score the residue pattern (observation made under indirect light conditions) of each tile from 0=very poor residue score up to 10=excellent, no residue on a 10 point scale. Results are then analyzed statistically. In case of current test, Perspex tiles were judged under indirect light conditions while mirror tiles were observed under razing light obtained with high power halogen lamp allowing to simulate sun light condition and therefore highlighting even low residue results.

What is claimed:

1. A glass cleaning wipe which comprises approximately:

(a) 30 wt. % to 40 wt. % of a nonwoven fabric consisting of 60 wt. % to 95 wt. % of wood pulp fibers, 2.5 wt. % to 10 wt. % of viscose fibers and 2.5 wt. % to 10 wt. % of polyester fibers; and (b) 60 wt. % to 70 wt. % of a liquid glass cleaning composition being impregnated in said nonwoven fabric, wherein said liquid glass cleaning composition comprises:

(i) 0.1 wt. % to 5 wt. % of an anionic surfactant;

(ii) 0.5 wt. % to 10 wt. % of a $C_1$–$C_4$ alkanol;

(iii) 0.5 wt. % to 8 wt. % of a cosurfactant;

(iv) 0.1 wt. % to 1 wt. % of a cationic quaternary alkylolamine salt;

(v) 0.01% to 0.1% of a preservative which is iodo propynyl butyl carbamate; and (vi) the balance being water, wherein the composition has a pH of about 7 to about 9.5.

2. The glass cleaning wipe of claim 1, wherein said cosurfactant is glycol ether.

3. The glass cleaning wipe of claim 2, wherein said glycol ether is propylene glycol N-butyl ether.

4. The glass cleaning wipe of claim 1, wherein said anionic surfactant is a $C_8$–$C_{18}$ ethoxylated alkyl ether sulfate surfactant.

5. The glass cleaning wipe of claim 4, wherein said glycol ether is propylene glycol N-butyl ether.

6. The glass cleaning wipe of claim 4, wherein said $C_1$–$C_4$ alkanol is ethanol or isopropanol.

7. The glass cleaning wipe of claim 6, wherein said cosurfactant is a glycol ether.

8. The glass cleaning wipe of claim 7 further including a perfume.

* * * * *